Figure 2:
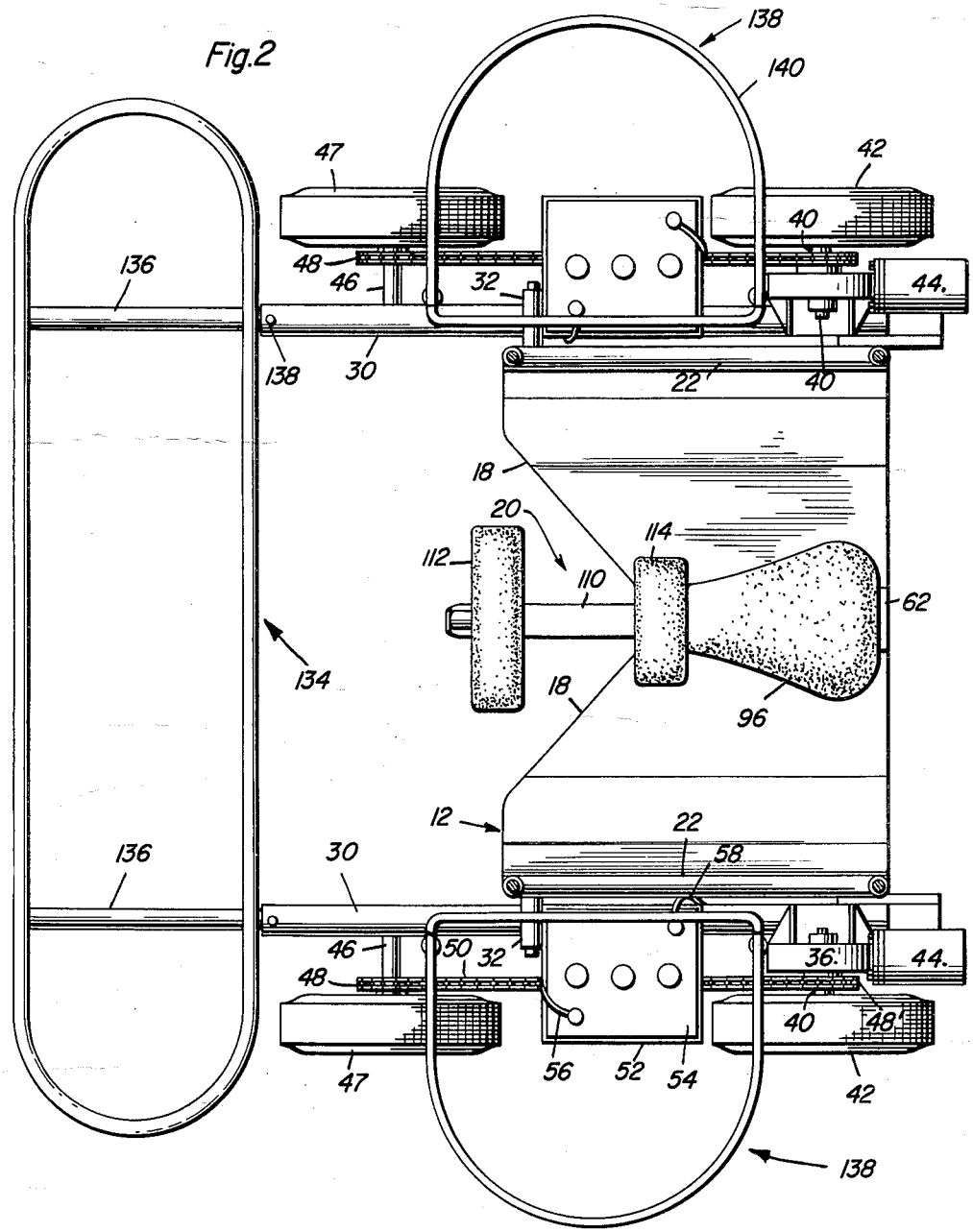

June 5, 1962          J. H. OLSON          3,037,570
POWERED VEHICLE CONTROLLED BY HARVESTING WORKER
Filed April 26, 1961          4 Sheets-Sheet 1
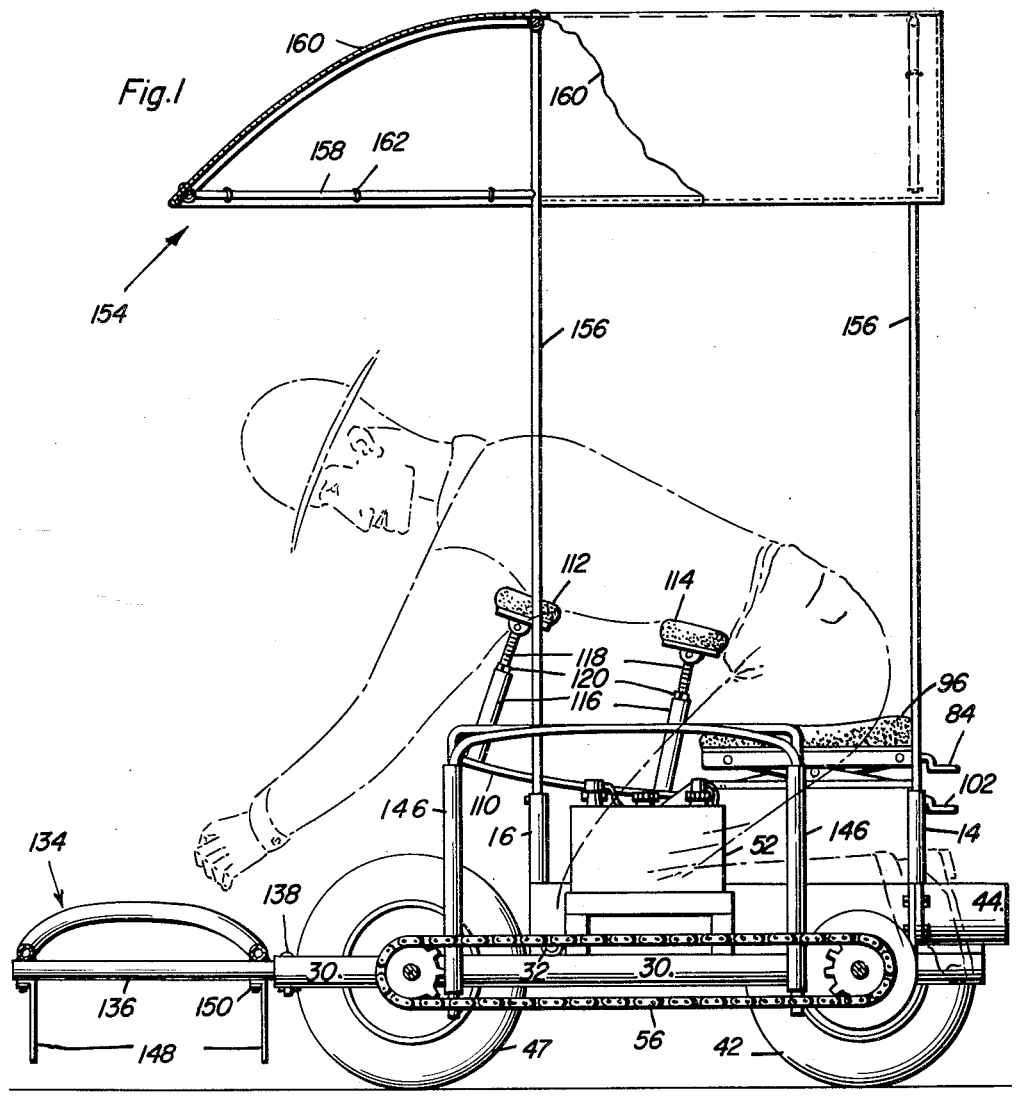
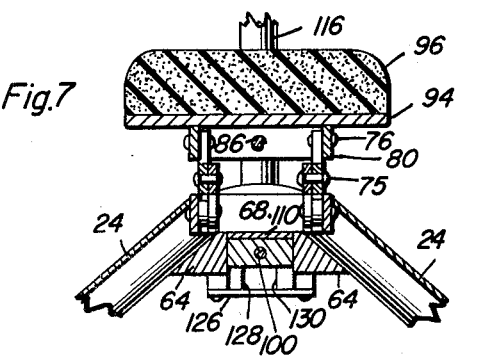
John Harold Olson
INVENTOR.
BY *Clarence A. O'Brien*
*and Harvey B. Jackson*
Attorneys June 5, 1962   J. H. OLSON   3,037,570
POWERED VEHICLE CONTROLLED BY HARVESTING WORKER
Filed April 26, 1961   4 Sheets-Sheet 2

John Harold Olson
INVENTOR.

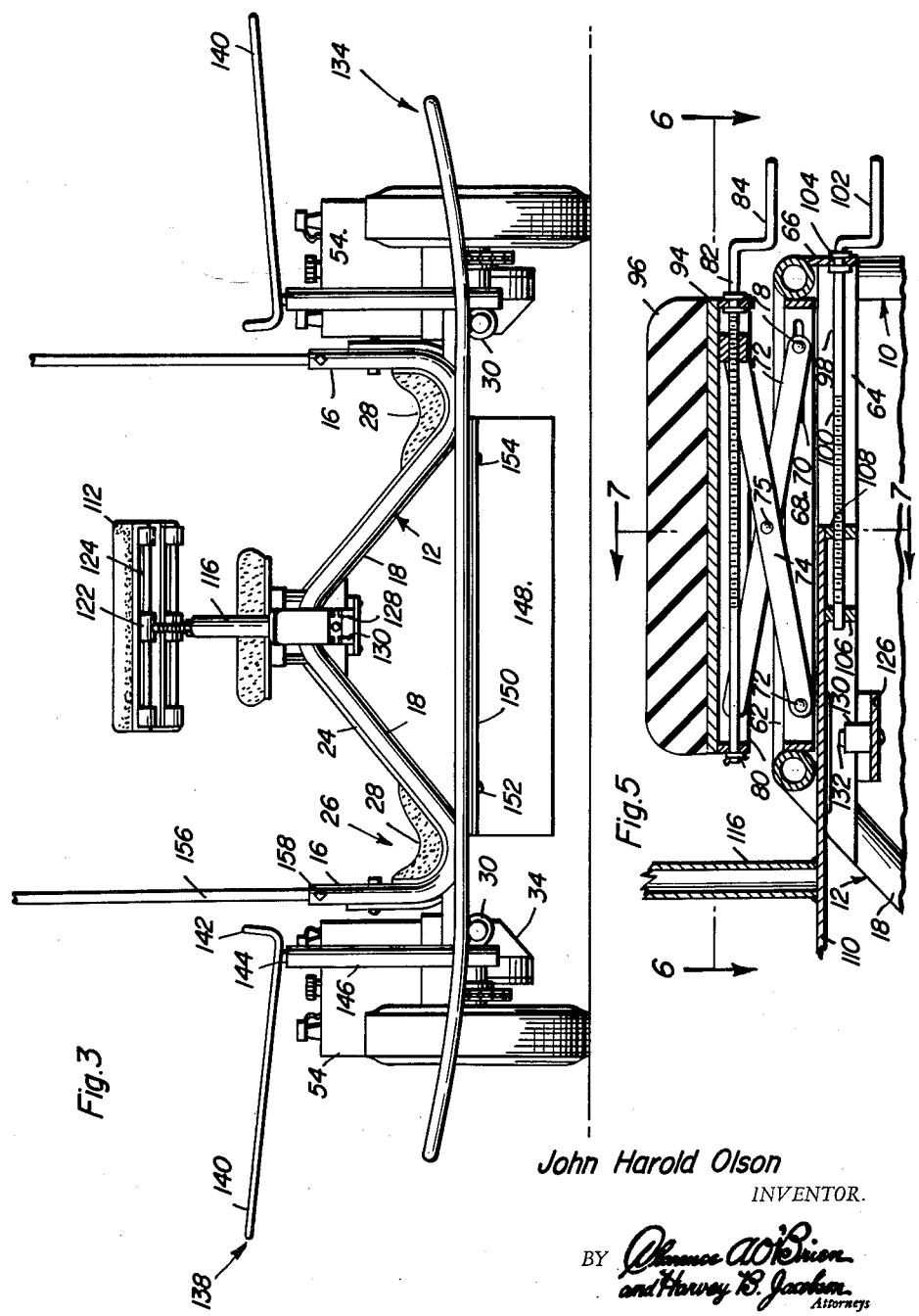

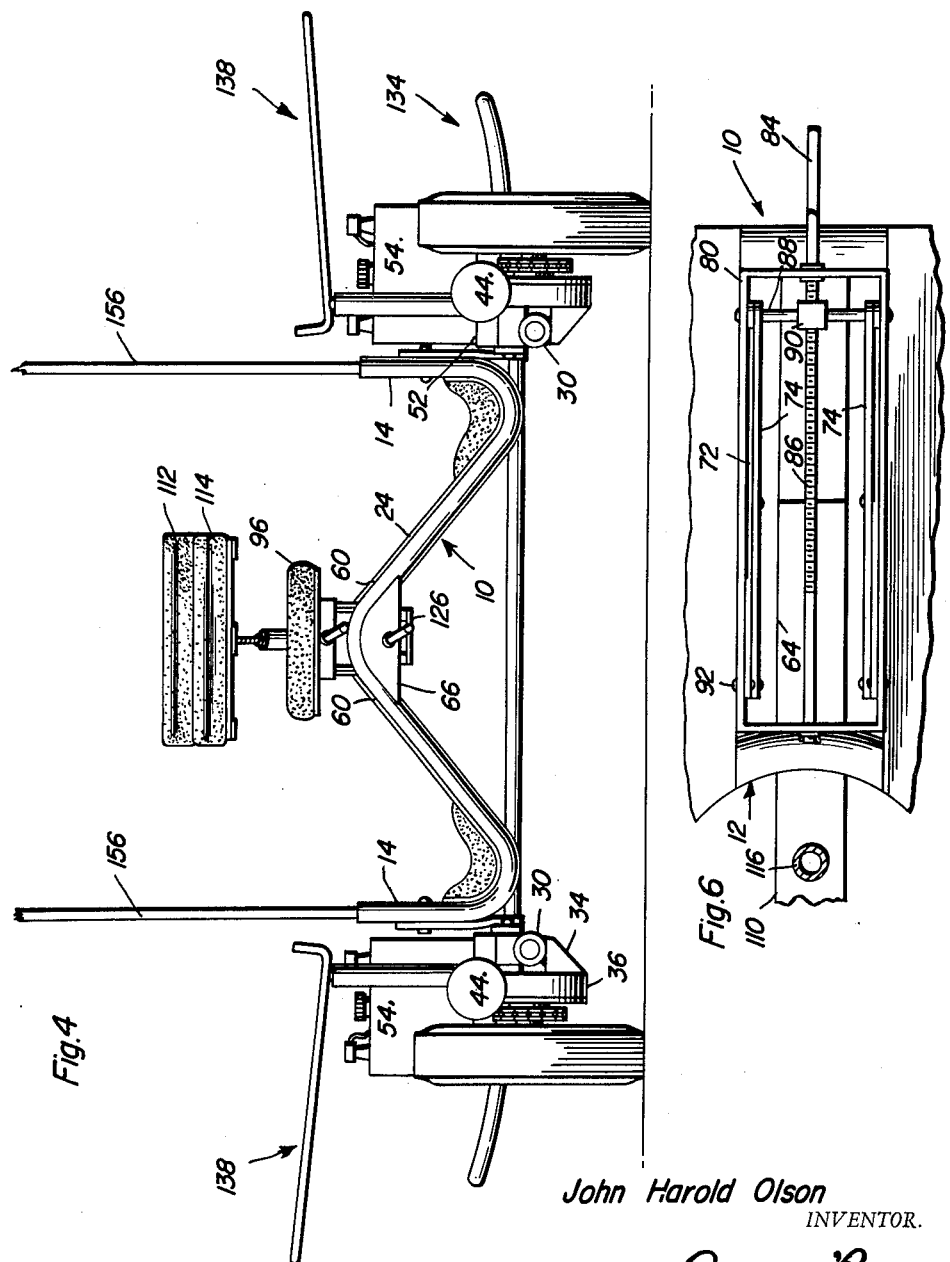

United States Patent Office 3,037,570
Patented June 5, 1962

3,037,570
POWERED VEHICLE CONTROLLED BY HARVESTING WORKER
John Harold Olson, 835 Marion St. NE., Salem, Oreg.
Filed Apr. 26, 1961, Ser. No. 105,638
2 Claims. (Cl. 180—6.5)

This invention relates to a vehicle, and more particularly to a power driven vehicle adapted to transport a berry picker or field worker in a kneeling position across a cultivated field which may contain fruit or berries to be harvested.

Briefly, the invention comprises a four wheel vehicle which is power driven and has means on its frame for supporting a field worker or harvester in a kneeling position with the trunk of his body substantially parallel to the ground. The means on the vehicle which support the chest and abdomen of the worker is connected to a throttle or rheostat whereby the speed of the vehicle can be controlled by varying the pressure on these supports. The head of the worker or harvester is over the front portion of the machine which has an opening in its frame exposing the surface of the earth therebelow and any fruit or vegetables growing thereon. On each side of this opening racks are provided for supporting containers. As the machine moves down a row of vegetables or fruit, the worker is supported in a very comfortable position by the supports on the machine and has both hands free for picking fruit through the opening in the machine. As he picks the fruit, he places it in the containers. The machine carries additional racks and containers so that it is not necessary for the worker to delay his harvesting when one container becomes filled. Enough containers are normally carried by the vehicle to permit the harvester to pick one entire row of fruit or vegetables.

Accordingly, it is a primary object of this invention to provide a vehicle which enables a harvester to ride thereon in a comfortable position and at the same time have both hands free for harvesting.

It is another object of the invention to provide a harvesting vehicle having novel speed and steering control means thereon.

It is still another object of the invention to provide a harvesting vehicle which is particularly adapted to make the harvesting of strawberries more economical, while at the same time it may be used in the harvesting of other fruits and vegetables or to weed row crops.

It is still another object of the invention to provide a vehicle for harvesters which has means thereon for comfortably supporting the body of a harvester and has a protective cover thereon for shielding him against the rays of the sun and inclement weather.

It is still yet another object of the invention to provide a harvesting machine which has means thereon that assist in separating the leaves from the fruit so as to facilitate more easy and rapid picking and harvesting of the fruit.

It is still yet another object of the invention to provide a harvesting vehicle which has a novel adjusting means for the seat and body support.

It is yet another object of the invention to provide a harvesting vehicle which provides comfort for the operator, speeds up the harvesting operation, eliminates destruction and trampling of the crops, and increases the over-all efficiency of the harvesting operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of my invention with parts of the left side of the machine removed;
FIGURE 2 is a plan view of FIGURE 1 with parts thereof removed;
FIGURE 3 is a front elevational view of the invention;
FIGURE 4 is a rear elevational view of the invention;
FIGURE 5 is an enlarged longitudinal, elevational cross sectional view of the seat and its operating mechanism;
FIGURE 6 is a cross sectional view taken substantially on the plane of line 6—6 in FIGURE 5; and
FIGURE 7 is a cross sectional view take substantially on the plane of line 7—7 in FIGURE 6.

Referring to the drawings, it can be seen that the frame of the vehicle comprises two transverse pipe members 10 and 12. As shown in FIGURE 4, the rear transverse member 10 has a central inverted V-section terminating in upwardly extending arms 14. The front transverse section 12 is of similar shape and terminates in the upwardly extending arms 16. However, as shown in FIGURE 2, the legs 18 forming the central V-section of the front transverse member 12 are canted upwardly to the rear to form a V-shaped recess 20. The arms 16 and 14 of the transverse members 10 and 12 are rigidly connected at their lower ends by horizontally extending longitudinal members 22. The upper surface of the members 10 and 12 is covered by flooring 24 preferably of sheet metal. As shown in FIGURE 3, the flooring 24 is also of V cross sectional shape in elevation and has its edges turned upwardly to form troughs 26 on each side thereof. Each trough 26 is lined with foam rubber padding 28.

The frame has side rails 30 extending parallel thereto and along each side thereof as shown in FIGURE 2. The side rails 30 are rigidly connected to the transverse pipe members 10 and 12 by outwardly projecting substantially horizontal shaft members 32, two of which are shown in FIGURE 2 at the forward portion of the floor structure. There are also preferably two additional pipe members 32 connecting the rear portion of the floor structure to the side rails 30.

Welded to the lower rear surface of each side rail 30 are mounts 34, see FIGURE 4, which are fixed to a gear housing 36. Rotatable inside the gear housing 36 is a toothed gear, not shown, fixed to the drive shaft 40 for a rear wheel 42. Secured to the top of the gear housing 36 is a housing 44 containing a D.C. electric motor. This motor has an axially extending horizontal shaft, the outer end of which has a worm gear thereon drivingly engaging the upper teeth of the gear in the housing 36, the motor, the worm gear, the gear, the gear housing 36 and the motor housing 44 all come as one fixed unit with all the rotating and movable parts enclosed in the motor and gear housing. Since this mechanism is of conventional construction, the details thereof are not shown. The forward portion of each rail 30 has a horizontally outwardly extending axle 46 fixed thereto. Each axle 46 has a front wheel 47 rotatable thereon, and each wheel is drivingly connected to a sprocket 48. Each rear drive shaft 40 also has a sprocket 48' fixed thereto and drives a front sprocket 48 by means of a chain 50.

A battery container 52 is fixed to the upper central portion of each side rail 30 and supports a conventional D.C. battery 54. Each battery is connected to one of the motors 44 by means of conductors 56 and 58.

All parts of the vehicle on one side thereof are of identical construction and design as on the opposite side thereof. Accordingly, a description of one side is sufficient to describe both sides of the vehicle.

Referring particularly to the central portion of the vehicle as shown in the drawings, it can be seen that the flooring terminates at 60 so as to form a substantially rectangular opening 62 in the upper central portion of the frame. Extending horizontally below the opening 62 are two angle iron members 64 parallel to one another as shown in FIGURES 6 and 7 and rigidly connecting the central portions of the transverse members 10 and 12 together. As shown in FIGURES 4 and 5, a generally triangular plate 66 is welded to the upper rear portion of member 10 for closing the opening 62.

Secured in the opening 62 between the members 10 and 12 is a rectangular frame 68 having elongated slots 70 in its side walls. A lazy tong structure comprising the links 72 and 74 pivotally connected at their centers is connected to the side walls of the frame 68 by means of a pivot pin 76 journalled in the frame and a pin 78 fixed to the lower end of the link 72 and slidable in the slot 70. The upper ends of the links 72 and 74 are pivotally connected to the side walls of a rectangular seat frame 80. Extending across the seat frame and journalled in the front and rear walls thereof is an operator shaft 82 having an operating handle and crank 84 integral therewith. The shaft 82 has a central portion threaded at 86. The upper ends of the parallel links 74 of the lazy tong are connected together by means of a pin 88 journalled in the ends of the links and rotatable in the frame 80. The central portion of the pin 88 is formed into a rectangular block 90 having a threaded aperture therein receiving the threaded portion 86 of the operating shaft 82. The upper ends of the links 72 of the lazy tong are pivotally connected to the frame 80 by means of pivot pins 92.

The seat frame 80 is covered by a rectangular seat plate 94 which in turn is covered by padding 96.

Journalled in the triangular plate 66 is a longitudinally horizontal second operating shaft 98 having a threaded portion 100 between its ends. The shaft 98 has an integral crank handle 102 on its rear end and is prevented from axial movement relative to plate 66 by means of integral radial flanges 104. Fixed between the angle members 64 is a bearing plate 106 having an aperture therein rotatably journalling the forward end of the shaft 98.

Threaded onto the threaded portion 100 of shaft 98 is an enlarged nut or block 108. Fixed to this block 108 is the rear end of a cantilever spring 110 which extends between the angle members 64 and is slidable on the top surface of bearing plate 106. The cantiliver spring 110 extends forwardly between the legs 18 of transverse member 12 and has fixed to its end a cushion chest support 112 and fixed to its central portion a cushion abdomen support 114. Each of these supports comprises a generally vertically extending tube or sleeve 116 fixed to the cantilever spring 110 and being internally threaded for receiving a threaded rod 118 which may be adjusted in the sleeve 116 by rotation and locked thereto by means of a locknut 120. As shown in FIGURE 3, the upper end of the rod 118 is fixed to a horizontally extending sleeve 122 which journals a transverse horizontally extending support rod 124 fixed to the support 112 or 114. By means of the support rod 124 and sleeve 122, the supports 112 and 114 may oscillate slightly on the vertical rods 118. Preferably, stops, not shown, are provided on the upper ends of the rods 118 so as to limit the oscillating motion of the supports 112 and 114.

A U-shaped saddle 126 extends transversely across and is connected to the lower surface of the angle member 64. The bight portion of the saddle 126 has connected to its upper surface two transversely spaced rheostat switches 128 and 130. These rheostat switches extend upwardly from the saddle 126 and each one is directly below one side of the spring 110. Preferably, the saddle member 126 is adjustable back and forth by conventional means on the angle members 64. The rheostat switches 128 and 130 each has an operating plunger 132 which is normally urged upwardly by a spring therebelow, not shown. When the cantilever spring 110 is pushed downwardly, it contacts the upper ends of the plungers 132 and forces them downwardly for completing circuits between the batteries 54 and the motors 44. The further the rheostat plungers 132 are pushed downwardly, the more current is supplied to the motors 44 for operating the vehicle at a faster speed. The rheostats 128 and 130 are of conventional construction, and therefore are not described in detail. The rheostat 130 is connected in the circuit connecting the right motor 44 to the right battery 54, and the rheostat switch 128 is connected in the circuit connecting the left motor 44 to the left battery 54.

As best shown in FIGURES 2 and 3, an oval rack 134 is supported on the front ends of the side rails 30 by means of longitudinally extending braces 136 fixed to each end of the rack which extend into the hollow rails 30 and are secured thereto by pins 138. The outer ends of the oval rack 134 are canted slightly upwardly.

A side rack 138 is fixed to each side of a side rail 30. Each side rack comprises a generally semi-circular open shelf 140 sloping slightly downwardly towards the center of the vehicle and having an upwardly extending flange 142 bent upwardly from its inner edge. Secured to the front and rear of the rack 138 are two vertical rods 144 which are slidably received in vertically extending sleeves 146 which are secured at their lower ends to the outer sides of the rails 30.

Hanging below the front and rear edges of the central portion of the rack 134 are canvas curtains 148 having their upper edges folded horizontally and secured to the rack 134 by means of flat strips 150 overlapping the edges of the curtains 148 and pressed thereagainst by screws 152 extending into the rack 134.

A roof structure 154 is supported over the vehicle by means of four vertically extending poles 156 which are connected at their upper ends to the roof structure and their lower ends extend into the hollow vertically extending arms 14 and 16. The poles 156 are retained in the arms 14 and 16 by means of set screws 158. The roof structure 154 is preferably composed of metallic rods 158 connected together and covered by a waterproof material such as canvas 160. The canvas or material 160 may be secured to the rods 158 by conventional clips 162. Preferably, the side edges and the forward edge of the roof structure are curved as shown in the left upper portion of FIGURE 1.

In operation, the operator of the harvesting machine straddles the seat cushion 96 as shown in FIGURE 1 in dotted lines and rests his knees on the foam rubber padding 28. He leans forward and rests his abdomen and chest on the supports 114 and 112, respectively. This supports the operator in a very comfortable position and permits him to extend both hands and arms downwardly and forwardly for reaching the surface of the ground below and forwardly of the vehicle. In this position, the operator may easily harvest or pick fruit, berries, weeds, etc. from the surface of the ground. If the operator is harvesting fruit, such as strawberries for example, he preferably places crates on each end of the rack 34. As he leans forwardly on the supports 112 and 114, the cantilever spring 110 is forced donwardly by his weight. As shown in FIGURES 3 and 5, as the cantilever spring 110 moves downwardly it contacts the upper ends of the plungers 132 of the rheostat switches 128 and 130. As these plungers move downwardly, the circuits to the motors 44 are closed thereby energizing the motors which in turn drive the rear wheels 42 by means of the worm gear and gear in the housing 36 and the drive shafts 40. The sprockets 48' which are fixed to the drive shafts 40 drive the endless chains 50, which in turn rotate the front sprockets 48 which drive the front wheels 47. This causes the vehicle to move forwardly, and as it does so, the canvas curtains 148 push the foliage forwardly away from the fruit so as to expose the fruit to the view of the operator whereby he may easily pick the fruit behind the curtains 148 and easily place the fruit in the containers, not shown, on the ends of the rack 134.

Empty crates are initially carried on the side racks 138.

However, as the operator fills the crates on the front rack 134, he reverses the location of the filled crates and empty crates.

The operator is effectively shielded from sun and rain by the roof structure 154.

The operator may control the speed of the vehicle and stop and start it at will by pressing down with his body on the supports 112 and 114. The harder he presses down on these supports, the further down the rheostat plungers 132 are pushed so as to supply more current to the motors 44 for increasing the speed of the vehicle. To stop the vehicle, it is only necessary for the operator to pivot his body upwardly slightly. The spring 110 then rises from the plungers 132, and these plungers are pushed upwardly by springs, not shown, so as to open the circuits to the motors. By twisting his body or by shifting sideways, the operator may twist the spring 110 about a generally horizontal axis so as to cause one of the plungers 132 of the rheostats 128 and 130 to move downwardly further than the other plunger. This causes the wheels on one side of the vehicle to operate at a faster speed than the wheels on the other side of the vehicle, thereby causing the vehicle to turn to one side. Therefore, it is apparent that the switches 128 and 130 not only function as a speed control means, but also function as a steering control for the vehicle. For example, if the operator shifts his weight to the right side of the supports 112 and 114 as viewed in FIGURE 2, this causes the right side of the spring 110 to move downwardly further than the left side and thereby push the plunger 132 of the rheostat switch 130 further downwardly than the plunger in the rheostat switch 128. This causes the wheels on the right side of the vehicle to operate or rotate at a faster speed than the wheels on the left side, consequently, the vehicle turns to the left. The vehicle may also be turned to the right by the operator when he shifts his weight to the left side of the supports 112 and 114.

Referring to FIGURES 5–7, it can be seen that the elevation of the seat 96 may be adjusted in an obvious manner merely by rotating the crank handle 84. Likewise, the spacing between the seat pad 96 and the supports 112 and 114 may be adjusted for comfort by rotating the handle 102 which moves the block 108 and spring 110 in a longitudinal direction. The force on the supports 112 and 114 necessary for operating the rheostat switch plungers 132 may be adjusted by operating the handle 102 which changes the length of the cantilever portion of the spring 110 extending forwardly of the bearing plate 106. Also, a similar adjustment may be made by moving the saddle 126 back and forth.

By carrying a supply of empty crates on the side racks 140, it is not necessary for the fruit harvester to leave the field for additional crates every time he fills the crate he is working with as is now necessary. When the operator returns from the field after filling all of his crates, the filled crates on the side racks 138 and front rack 134 may be removed as a group simply by lifting upwardly on the side racks 138 so as to permit their rods 144 to slide upwardly and out of the sleeves 146. The rack 134 may be removed from the vehicle simply by lifting out the pins 138 and moving the rack forwardly. The racks are especially adapted to be lifted from the vehicle by conventional powered lift trucks in common use around warehouses and farms.

It has been found during actual use of the vehicle disclosed herein, that a fruit harvester using the invention to pick strawberries, can harvest several times as much fruit in one day as he formerly could without use of the invention. This is due to the fact that the operator is very comfortably supported on the cushion support members 112, 114, 96 and 28. Also, the operator has both hands free for picking, and since he is very comfortably supported, he can work continuously without becoming tired. Also, his comfort is increased by the roof structure 154 which furnishes him shade and protection from the elements. The roof structure also permits him to work during inclement weather. Further waste of time is saved by carrying along a spare supply of empty crates on the side racks 132. By having the crates being filled placed very close to the operator's hands on the front rack 134, it is apparent that much unnecessary motion of the operator's hands and arms is prevented.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle for transporting a crop harvester comprising a frame, a plurality of rotatable wheels on said frame for supporting it above the surface of a field, power means connected to at least one of said wheels for rotating it, support means on the frame for comfortably supporting the crop harvester in a face down kneeling position with the upper portion of his body in a generally horizontal position whereby he may reach down below the frame and harvest crops near the surface of the field, said support means comprising knee supports, a seat and a torso support, said power means including motor means connected to said wheels and control means for controlling the speed of said motor means, said torso support being mounted on spring means, said spring means being operatively connected to said control means whereby the crop harvester may control the speed of the vehicle by varying the pressure of his body on said torso support.

2. A vehicle as defined in claim 1 wherein the wheels on each side thereof are driven by separate motor means which are controlled by separate control means whereby the vehicle may be steered.

References Cited in the file of this patent

UNITED STATES PATENTS

| | | |
|---|---|---|
| 786,995 | Richardson | Apr. 11, 1905 |
| 1,756,803 | Williams | Apr. 29, 1930 |
| 2,317,606 | Harris | Apr. 27, 1943 |
| 2,378,947 | Harris | June 19, 1945 |
| 2,798,565 | Rosenthal et al. | July 9, 1957 |

FOREIGN PATENTS

| | | |
|---|---|---|
| 334,526 | Switzerland | Jan. 31, 1959 |